United States Patent [19]

Balzer

[11] Patent Number: 4,582,138
[45] Date of Patent: Apr. 15, 1986

[54] METHOD FOR OIL RECOVERY FROM RESERVOIR ROCK FORMATIONS

[75] Inventor: Dieter Balzer, Haltern, Fed. Rep. of Germany

[73] Assignee: Huels Aktiengesellschaft, Marl, Fed. Rep. of Germany

[21] Appl. No.: 585,655

[22] Filed: Mar. 2, 1984

Related U.S. Application Data

[63] Continuation-in-part of Ser. No. 300,547, Sep. 9, 1981, abandoned, and a continuation-in-part of Ser. No. 349,947, Feb. 18, 1982, abandoned.

[30] Foreign Application Priority Data

Mar. 4, 1983 [DE] Fed. Rep. of Germany ....... 3307712

[51] Int. Cl.⁴ ............................................ E21B 43/22
[52] U.S. Cl. .................................. 166/273; 166/274; 252/8.55 D
[58] Field of Search .................. 252/8.55 D; 166/273, 166/274, 275, 252

[56] References Cited

U.S. PATENT DOCUMENTS

| | | | |
|---|---|---|---|
| 3,149,669 | 9/1964 | Binder et al. | 252/8.55 X |
| 3,208,515 | 9/1965 | Meadors | 252/8.55 X |
| 3,811,504 | 5/1974 | Flournoy et al. | |
| 4,016,932 | 4/1977 | Kalfoglou | |
| 4,157,115 | 6/1979 | Kalfoglou | |
| 4,165,785 | 8/1979 | Schievelbein | 252/8.55 X |
| 4,217,958 | 8/1980 | Doster et al. | |
| 4,236,579 | 12/1980 | Kalfoglou | |
| 4,269,270 | 5/1981 | Kalfoglou | |
| 4,281,714 | 8/1981 | Whittington et al. | |
| 4,293,428 | 10/1981 | Gale et al. | |
| 4,457,373 | 7/1984 | Balzer et al. | 252/8.55 X |
| 4,478,281 | 10/1984 | Balzer et al. | 252/8.55 X |
| 4,485,873 | 12/1984 | Balzer et al. | 166/274 |

OTHER PUBLICATIONS

Lepper, "Erdoel Erdgas Zeitschrift", 92:426 (1976).
Balzer et al., "Tenside Detergents", 16:256 (1979).
Falcone et al., JAOCS, vol. 59, No. 10 826A (1982).
Balzer, Oil Gas–European Magazine, 1/83, p. 50.

*Primary Examiner*—Herbert B. Guynn
*Attorney, Agent, or Firm*—Millen & White

[57] ABSTRACT

A process for the tenside flooding of reservoirs of medium and high salinities, comprises injecting an emulsion of an oil phase, an aqueous phase, and carboxymethylated oxethylate by flooding before and/or after a solution or dispersion of carboxymethylated oxethylate. In each case, the tenside and/or the emulsifier is selected so that the phase inversion temperature of the system of reservoir oil/flooding water/tenside/optional additives or reservoir oil/flooding water/emulsifier/optional additives, respectively, lies about 0° to 10° C. above the reservoir temperature. This method reduces tenside retention as compared with the state of the art.

20 Claims, No Drawings

METHOD FOR OIL RECOVERY FROM RESERVOIR ROCK FORMATIONS

CROSS REFERENCE TO RELATED APPLICATION

This application is a continuation-in-part of U.S. applications Ser. Nos. 300,547, filed Sept. 9, 1981 and 349,947, filed Feb. 18, 1982, both now abandoned. This application is related to application Ser. Nos. 300,427, filed Sept. 9, 1981, now U.S. Pat. No. 4,478,281, 349,945, filed Feb. 18, 1982, now U.S. Pat. No. 4,457,373, 413,908, filed Sept. 1, 1982, now U.S. Pat. No. 4,485,873, and 472,308, filed Mar. 4, 1983, now abandoned, all of whose disclosures are incorporated by reference herein.

BACKGROUND OF THE INVENTION

The present invention relates to a method for oil recovery by tenside and/or emulsion flooding.

In the extraction of oil from oil-bearing reservoirs, it is generally possible only to recover a fraction of the originally present oil by means of primary extraction methods. In this procedure, the oil is brought to the earth's surface using the natural reservoir pressure. In secondary oil recovery, water is forced into one or several injection bore holes in the formation. The oil is pushed to one or several production wells and thereafter brought to the surface. This so-called water flooding as a secondary measure is relatively inexpensive and accordingly is frequently employed. However, in many cases it leads to only a minor increase in oil extraction from the deposit.

An effective displacement of the oil, which is more expensive but urgently required from the viewpoint of the economy because of the present scarcity of petroleum, is accomplished by tertiary measures. These are understood to include processes wherein the viscosity of the oil is reduced and/or the viscosity of the flooding water is increased and/or the interfacial tension between water and oil is lowered.

Most of these processes can be classified as solution or mixture flooding, thermal oil recovery methods, tenside or polymer flooding and/or as a combination of several of the aforementioned methods.

Thermal recovery methods include the injection of steam or hot water and/or take place as a subterranean combustion. Solution or mixture processes reside in injecting a gaseous or liquid solvent for the petroleum into the deposit.

Tenside flooding processes, depending on the tenside concentration and in some cases the type of tenside, and also on the additives used, are distinguished among tenside-supported water flooding, customary tenside flooding (low-tension flooding), micellar flooding, and emulsion flooding. All are based primarily on a strong lowering of the interfacial surface tension between oil and flooding water. However, in some instances, especially in the presence of relatively high tenside concentrations, water-in-oil dispersions are created having a markedly increased viscosity as compared with the oil. Thus, the tenside flooding step also aims at reduction in the mobility relationship whereby the degree of effectiveness of the oil displacement is raised. Pure polymer flooding is based predominantly on the last-described effect of a more favorable mobility ratio between oil and the pursuing flooding water.

Heretofore, organic sulfonates, such as alkyl, alkylaryl, or petroleum sulfonates, have been used primarily as oil-mobilizing tensides. However, these compounds exhibit a very low tolerance limit with respect to the salinity of the water in the deposit. Salt concentrations even as low as 1,000 ppm are considered problematical. The sensitivity of these tensides against alkaline earth ions is especially pronounced. In this respect, approximately 500 ppm is assumed to be the upper critical limit concentration (U.S. Pat. No. 4,100,228). In the presence of higher salt concentrations, precipitation products in the form of insoluble salts are formed when using these tensides. Thereby, on the one hand, material is lost for the desired effect in the oil-water interface; on the other hand, the precipitation products can lead to clogging of the formation. However, since many deposit waters possess substantially higher salinities (approximately half the North American light oil deposits exhibit salinities of around 100,000 ppm and higher, and there are many oil fields in North Germany having salinities of up to about 250,000 ppm, the content of dissolved alkaline earth ions being considerable in most cases), attempts have been made to find ways and means for exploiting the otherwise good oil-mobilizing properties of the organic sulfonates even for deposit systems having a relatively high salinity. In admixture with cosurfactants, such as alcohols or nonionic tensides, organic sulfonates also proved to be less sensitive to electrolyte.

In accordance with U.S. Pat. Nos. 4,016,932 and 3,811,504, it is possible to further increase the salinity tolerance of the organic sulfonates in admixture with other tensides.

In contrast to the group of organic sulfonates, the carboxymethylated alkyl or alkylaryl oxyethylates, just as the group of sulfated and sulfonated oxethylates (U.S. Pat. No. 4,293,428), show good compatibility even with extremely high-salinity deposit waters (250,000 ppm and higher). Alkaline earth ions possess no deleterious effect, even at concentrations of 30,000 ppm; on the contrary, their presence is even desirable, as demonstrated in German Pat. No. 3,033,927. Inasmuch as these tensides have a strongly oil-mobilizing effect, are stable under deposit conditions (as found by long-term experiments (cf. D. Balzer, Proceedings 2nd European Symposium Enhanced Oil Recovery, Paris 1982) and their production is simple and economical, they are very well suited for use in oil displacement in medium- and high-salinity deposit systems (10,000–250,000 ppm total salt content).

However, tenside flooding not only presents problems regarding a higher salinity of the reservoir, which has been overcome by the use of carboxymethylated oxethylates as the tensides, but a considerable problem also resides in tenside retention, which occurs in all cases. A considerable amount of injected tenside is lost by adsorption on the rock surface and by the so-called "phase trapping", meaning a trapping of liquid droplets of frequently high tenside content in the rock formation in front of pore constrictions. The two processes highly contribute toward tenside retention, which in the final analysis is really the total amount of tenside retained in the pore space during tensile flooding. Therefore, a prerequisite for an economical oil recovery by tertiary methods with the aid of tensides is that the tensides be highly effective and also that their retention be minor.

Several processes have been described in the literature wherein reduced tensile retention is achieved either by flooding with an additional active agent before use of the tenside solution or dispersion, or by admixing such active agent to the tenside solution or dispersion. Thus, lignin sulfonate proper (see U.S. Pat. No. 4,157,115) or lignin sulfonate in ethoxylated or propoxylated form (see U.S. Pat. No. 4,236,579) or in sulfomethylated form (see U.S. Pat. No. 4,269,270) lowers tenside adsorption on the rock surface. Maleates and succinates show similar effects as well (see U.S. Pat. No. 4,217,958). Also preliminary flooding with an aqueous LiCl solution is said to lower retention in case of tenside mixtures of petroleum sulfonate and ether sulfonate (see U.S. Pat. No. 4,281,714). However, these "sacrificial materials" act primarily as adsorption reducers, and the adsorption process is merely one of many processes contributing toward retention. Apparently, a strongly retention-reducing effect, at least in the case of low-salinity reservoir systems and with petroleum sulfonates as the tenside, is exerted by preliminarily flooded solutions of sodium carbonate or sodium orthosilicate, as demonstrated in several scientific publications [for example J. S. Falcone et al., JAOCS 59:826 A (1982)]. The injection of a strongly alkaline solution, however, also represents massive interference in the complicated equilibria of a deposit. Thus, use of these solutions also entails problems just as in connection with the process of alkali flooding.

Noticeable reduction in tenside retention is obtained by a modified tenside flooding method, using carboxymethylated oxethylates, by injecting the tenside in the form of an emulsion maximally adapted to the system (i.e., deposit water as the aqueous phase and deposit oil as the organic phase). If here the tenside or emulsifier is selected so that the phase inversion temperature of the system of crude oil/formation water/tenside (emulsifier) is at the deposit temperature or up to about 10° C. thereabove, then this emulsion flooding method provides extensive reduction of the originally present oil without the formation of uncontrollably high pressure gradients (DOS No. 3,105,913 and U.S. Ser. No. 349,945, of Feb. 18, 1982, now U.S. Pat. No. 4,457,373). One disadvantage of this method, however, is that part of the oil injected as an emulsion is not extracted again by flooding. Compared with the amount of oil recoverable by the tertiary recovery method, this last amount is not inconsiderable. The high barrier, from a psychological and economic standpoint, facing an oil producer of reinjecting expensively extracted (or additionally purchased) oil, thus becomes even more insurmountable, especially in view of the considerable time span (years) between injection and production.

SUMMARY OF THE INVENTION

Accordingly, it is an object of this invention to provide a method of recovering oil using carboxymethylated oxethylates, which have a strongly oil-mobilizing effect in the case of medium- to high-salinity deposits, which involves a low tenside retention degree similar to that encountered with emulsion flooding, but without having to force a large amount of oil into the deposit for this purpose.

It is another object of this invention to provide such a method which essentially retains the advantages of flooding processes described above and/or eliminates or ameliorates the disadvantages described above.

Upon further study of the specification and appended claims, further objects and advantages of this invention will become apparent to those skilled in the art.

These objects have been achieved by providing a method for oil extraction from oil-bearing reservoir formations of medium or high salinity, comprising successively injecting at least two tenside-containing liquids therein, wherein either the preceding or the subsequent flooded liquid or, in the case of three liquids, the first and the second or third flooded liquids, are emulsions, comprising an oil phase, an aqueous phase, and a carboxymethylated oxethylate as the emulsifier, the latter being selected so that the phase inversion temperature of the system of reservoir oil/flooding water/emulsifier/and optional additives lies 0°–10° C. above the reservoir temperature, and wherein the other injection liquid(s) is (are) either a solution (solutions) or a dispersion (dispersions) of carboxymethylated oxethylate in flooding water, wherein this (these) tenside(s) likewise is (are) selected so that the phase inversion temperature of the system reservoir oil/flooding water/tenside/optional additives lies 0°–10° C. above the reservoir temperature.

DETAILED DISCUSSION

According to this invention, surprisingly it has been observed that low tenside retention values similar to those of emulsion flooding prevail in tenside flooding with carboxymethylated oxethylates if, prior to the injection of the tenside slug, an emulsion slug is injected, which latter can be of a relatively small volume. Similarly advantageous for reduction of tenside retention is also a small-volume emulsion slug injected after the injection of the tenside slug. Of course, these two process versions can also be combined with each other.

In preferred methods of this invention, there are used as the emulsifiers and tensides, carboxymethylated oxethylates of the formula $R-(OC_3H_6)_m(OC_2H_4)_nOCH_2COOM$ wherein R is a linear or branched aliphatic residue of 6–20 carbon atoms or an alkylaromatic residue of 3–18 carbon atoms in the alkyl group, or a dialkylaromatic residue of 1–18 carbon atoms per alkyl chain, the total number of carbon atoms in both alkyl chains being 5–30, or a trialkylaromatic residue of 1–18 carbon atoms per alkyl chain wherein the total number of carbon atoms in the three alkyl chains is 6–40, m is 0–20, n is 1–20, M is an alkali or alkaline earth metal ion or ammonium, and the degree of carboxymethylation is 10% to 100%; the successively injected, tenside-containing liquids contain the same tenside; the successively injected, tenside-containing liquids contain tensides having a different structure, but exhibit approximately the same phase inversion temperature of the system of reservoir oil/flooding water/tenside; the tenside or emulsifier concentration is 0.1–30% by weight based, in the case of emulsions, on the aqueous phase; the crude oil of the reservoir is used as the organic phase; the volume ratio of organic phase to aqueous phase in the emulsion is 3:1 to 1:10; the size of the slug of tenside-containing liquids is 0.01–2 pore volumes; a small-volume emulsion slug is flooded in before the tenside slug; additives are added to the tenside-containing liquids; the additives are cosurfactants such as mono- and polyhydric alcohols; the additives are water-soluble; viscosity-raising polymers; There is injected, prior to injection of the first tenside-containing liquid, 0.05–4 pore volumes of flooding water into the reservoir; after injection of the last tenside-containing liquid, flooding water is injected into the reservoir; or the flooding water contains a water-soluble, viscosity-raising polymer.

Thus, the corresponding tensides are mixtures of 0–90 wt.% of oxethylates of the formula

R—(OC₂H₃(CH₃))ₘ(OC₂H₄)ₙH and 100–10 wt.% of carboxymethylated oxethylates of the formula

R—(OC₂H₃(CH₃))ₘ(OC₂H₄)ₙOCH₂COOM wherein

R is a hydrocarbon aliphatic group of 6–20 carbon atoms, an alkylphenyl residue of 3–18 carbon atoms in the alkyl group, a dialkylphenyl residue of 1–18 carbon atoms per alkyl group, the total number of carbon atoms in both alkyl chains being 5–30, or a trialkylphenyl residue of 1–18 carbon atoms per alkyl chain wherein the total number of carbon atoms in the three alkyl chains is 6–40;

m is 0–20;

n is 1–20;

M is an alkali or alkaline earth metal ion or ammonium.

U.S. Ser. No. 349,945 demonstrates that the carboxymethylated oxethylates form stable emulsions even in the presence of high-salinity deposit waters. It is likewise demonstrated therein how these tensides can be adapted to the conditions of a deposit in such a way that no uncontrollably high pressure gradients occur. Therefore, no special difficulties will be encountered regarding injection of the emulsion slug and/or tenside slug. In this regard, attention is also directed to the several other U.S. applications discussed above.

A criterion for proper adaptation of the tenside to the deposit conditions is the phase inversion temperature (PIT) of the injected emulsion or emulsions as well as of the deposit system of crude oil/formation water/tenside/optional additives, the values of which are likewise to range about 0°–10° C. above the deposit temperature.

The PIT's are determined conventionally by measurement of electric conductivity. For measuring the PIT of the deposit emulsion, deposit oil, formation water (volume ratios of oil/water of 1:1, 1:2, or 1:3 generally) and the tenside of the tenside slug (1% or 2%, based on the aqueous phase generally), as well as optional additives (i.e., the ingredients which will be in the deposit) are mixed together. Their electric conductivity is determined in dependence on the temperature. At the PIT, an oil/water emulsion changes over into a water/oil emulsion, and/or vice versa, the electric conductivity greatly decreasing or increasing at this point. The temperature at which the electric conductivity reaches the mean value between upper (o/w) and lower (w/o) level is recorded as the PIT.

In rare cases of deposit systems, the clear determination of a PIT value presents difficulties, so that it may be advantageous to supplement the PIT measurements by interfacial surface tension measurements to conventionally determine the same point of change.

If a different tenside is used in the emulsion to be injected than in the tenside slug, or if different additives are employed, the PIT of this different tenside system must be measured in the presence of deposit oil and formation water and/or flooding water, as described hereinabove.

If a different oil or water is used in the emulsion to be injected, then the PIT of this respective emulsion must also be measured as described above. Thus, in the extreme case, a number of differing PIT's can exist each of which must fulfill the requirement that they are at or up to about 10° C. above the deposit temperature. This will ensure that the overall system in the deposit at any time has the proper PIT.

The present invention concerns the use of carboxymethylated oxethylates as tensides having an oil-mobilizing and emulsifying effect. These compounds can be prepared in accordance with German Pat. No. 2,418,144 by reacting oxethylates of the formula R—(OC₂H₄)ₙH or R—[OC₂H₃(CH₃)]ₘ(OC₂H₄)ₙH with a salt of chloroacetic acid in the presence of an alkali hydroxide or other bases. However, other manufacturing methods are likewise suitable. In this connection, R is a saturated or unsaturated, straight-chain or branched alkyl residue of 6–20, preferably 8–16 carbon atoms, or an alkyl-aryl residue of 3–18, preferably 4–16 carbon atoms in the alkyl chain, or a dialkylaryl residue of 1–18, preferably 4–14 carbon atoms per alkyl chain, wherein the total number of carbon atoms in both alkyl chains is to be 5–30, preferably 8–24, or a trialkylaromatic residue of 1–18 carbon atoms per alkyl chain, wherein the total number of carbon atoms in the three alkyl chains is to be 6–40, preferably 8–30. Symbol m can assume values from 0 to 20, preferably 0–10, n can assume values from 1 to 30, preferably 1–20. The cation can be sodium, potassium, lithium, ammonium, calcium, or magnesium, etc. Suitable alcohols, the oxethylates of which form the basis for the carboxymethylates, are, for example: hexyl alcohol, octyl alcohol, nonyl alcohol, decyl alcohol, undecyl alcohol, lauryl, tridecyl, myristyl, palmityl, and stearyl alcohols, but also unsaturated alcohols, such as, for example, oleyl alcohol. The alkyl chain can be normal or branched-chain. Suitable alkyl phenols are, for example: butylphenol, pentylphenol, hexylphenol, octylphenol, nonylphenol, decylphenol, undecylphenol, dodecylphenol, tridecylphenol, as well as the corresponding dialkyl phenols, such as, for example, 2-methyl-4-tridecylphenol, 2-dodecyl-4-ethylphenol, dinonylphenol, etc. The alkyl chain can be normal or branched. Suitable trialkylphenols include Tributylphenol, Nonyldibutylphenol, Octyl-, Isononyl-, Isododecylxylenol, Dinonylcresol.

The oxalkylation can be effected in the presence of catalytic amounts of alkali metal hydroxide with 0–20, preferably 0–10 moles of propylene oxide/mole of hydroxy compound and thereafter with 1–30, preferably 1–20 moles of ethylene oxide/mole of hydroxy compound. The thus-produced oxalkylates are mixtures of homologs. The subsequent carboxymethylation can be complete if the mode of operation is suitable, so that the carboxymethylated oxethylates are purely anionic tensides. Alternatively, with incomplete carboxymethylation, the products still contain larger or smaller amounts of unreacted oxethylate. Therefore, the formula R—(OC₃H₆)ₘ(OC₂H₄)ₙOCH₂COOMe frequently means a mixture with varying amounts of unreacted oxethylate. Accordingly, a degree of carboxymethylation can be defined. It has been found that mixtures having a degree of carboxymethylation of between 10% and 100%, preferably between 50% and 100%, are capable of displacing the oil effectively. In order to avoid chromatographic separation during transportation of the tenside in the deposit, maximally uniform products are desirable, i.e., having a degree of carboxymethylation of close to 100%, e.g., 90–100%, preferably 95–100%. The % value represents value percent by weight.

The aforedescribed mixtures of anionic and nonionic tenside, called carboxymethylated oxethylates, are soluble or at least readily dispersible in the usual formation waters, and no precipitation whatever are observed.

The following routine procedures is preferably followed in the selection of a suitable tenside. With knowledge of the deposit temperature and/or in some cases a temperature range, the PIT is measured for orientation purposes with the crude oil, the formation water, optionally the gas of the deposit, and a carboxymethylated oxethylate of the aforementioned formula that appears suitable. This measurement is to be repeated, if necessary, with further tensides of this class and, optionally, additives.

Based on the measured results, the carboxymethylated oxethylate is then tailor-made; its oil-mobilizing efficacy for the respective deposit system can be verified by one or several preliminary tests in a sand pack as the model formation, or in connection with original drilling cores and/or model drilling cores.

The carboxymethylated oxethylates, on account of their chemical structure, offer several opportunities for "molecular architecture" with the goal of setting a desired phase inversion temperature in a system. These are the hydrophobic residue R, the degrees of oxethylation m and n, as well as the degree of carboxymethylation. The effect of the individual structural parameters on the phase inversion temperature has been demonstrated (see D. Balzer, loc, cit.). The general rule is that an increase in hydrophobicity of the tenside ion lowers the phase inversion temperature, and an increase in hydrophilicity raises this temperature. A lengthening of the hydrophobic residue or an increased m thus leads to a lowering of the phase inversion temperature, and an increase in n or an increase in the degree of carboxymethylation leads to an increase of the phase inversion temperature. These dependencies are, in part, very much pronounced and permit optimum adaptation of the carboxymethylated oxethylates to the conditions of the respective deposit.

According to this invention, the tenside is injected both an an emulsion and as a solution or dispersion into the deposit. Since emulsions according to their generic definition can be considered dispersions, the term emulsion here is understood to mean a distribution wherein one of the liquids is crude oil, a hydrocarbon, a crude oil-hydrocarbon mixture, or a hydrocarbon mixture. Thus, an o/w or w/o emulsion, with the tenside of this invention as emulsifier, results. The tenside dispersion, in contrast thereto, does not contain crude oil or hydrocarbon but is merely a dispersion of the tenside in flooding water.

The emulsion to be injected can be produced from the original crude oil, the formation water, the tenside, and optional additives in accordance with the well known fully conventional methods of emulsion preparation (see P. Becher, Emulsions Theory and Practice, New York, 1965); no appreciably high shear forces are required in this connection. It is also possible to heat the mixture consisting of oil, water, tenside, as well as optional additives, up to the PIT and stabilize the emulsion, which is then formed under gentle agitation and consists of very fine droplets, by means of rapid cooling. The emulsions are relatively stable at temperatures $\geq 15°$ C. below the PIT; in some cases, slight stirring in the storage container is recommended.

Instead of using the original crude oil, it is also possible to employ, for preparing the emulsion of this invention, other crude oils, crude oil mixtures, partially refined crude oil fractions, gas oils, kerosine, or naphthas, as well as mixtures thereof with crude oil. Suitable as the organic phase of the emulsion of this invention are also mixtures of pure $C_{5-30}$-hydrocarbons; however, for economical considerations, they will usually not be utilized.

According to this invention, a tenside solution or dispersion is injected into the formation after or before the mentioned emulsion. The basic requirement is that at least one emulsion and at least one dispersion or solution is injected. It also may be useful to inject an alternating sequence of emulsion slug and tenside slug. Thus, when three liquids are injected, the order can be emulsion/solution or dispersion/emulsion, but also: solution or dispersion/emulsion/solution or dispersion, among others, e.g., solution or dispersion/emulsion/solution or dispersion/emulsion, etc. In general, the predominant proportion of the tenside or tensides will be injected as a dispersion or solution. Overall, 5–50 wt.%, preferably 10–30 wt.% of the total tenside added will be in the form of the emulsion and the remainder in the form of a dispersion or solution.

Model flooding tests, if at all possible carried out on original drill cores, can be utilized to optimize the volume(s) of the emulsion(s) to be injected, the phase relationship(s) thereof, the tenside concentration(s), any possible additives, and the volume(s) of the dispersion(s) or solution(s) to be injected, the tenside concentration(s) thereof, and possible additives, as well as the sequence of emulsion(s) and dispersion(s) or solution(s) and furthermore the type and size of any mobility-controlling polymer solution.

Based on these preliminary tests, emulsion(s) and dispersion(s) or solution(s) are conventionally introduced into the formation by means of injection pumps. This is generally done in the form of slugs, i.e., of a narrowly limited volume of 0.01–2 PV (=pore volume of the deposit), preferably 0.02 to 1.2 PV. The size of the individual slug is dependent, above all, on the tenside concentration and on conventional considerations of economy. The emulsifier concentration, based on the aqueous phase, generally is 0.1–30%, preferably 0.5–15%. The phase relationship(s) of the emulsion(s) of oil/water will generally be 1:20 to 4:1, preferably, the phase ratios are 1:8 to 2:1. The tenside concentration of the tenside solution or dispersion is 0.1–30%, preferably 0.2–15%. The volume of an emulsion slug flooded before or after a tenside dispersion or solution slug should have a ratio to the volume of the tenside dispersion or solution slug of 1:60 to 2:1, preferably 1:20 to 1:2. If the intermediate liquid is an emulsion, the same volume proportions apply. (The volume proportions apply to the sum of all injected solutions/dispersions and to the sum of all emulsions).

Suitably, water flooding is carried out prior to injection of the tenside liquids; the flooding water used is preferably the produced formation water. In special cases it may be advantageous to conduct flooding with a water having a composition different from that of the formation water. This can be done for logistic reasons, or there may be the desirable factor of conditioning the deposit with regard to a specific salinity. The size of the flooding water slug is 0.01–4 PV, preferably 0.1–4 PV.

For reasons of a more favorable adaptation of the viscosities of the tenside liquids to the oil of the deposit or in order to reduce tenside and in some cases polymer retention, it may be advantageous to add to the tenside or a conventional polymer slug, mono- and polyhydric alcohols, e.g., di- or trifunctional as cosurfactants, e.g., in concentrations of 0.1–3 wt.%. Suitable cosurfactants include, for example, isopropanol, isobutanol, n-butanol, tert-amyl alcohol, 2-ethylhexanol, butyl diglycol, butyl triglycol, etc. As with any additives, these must be considered when measuring the PIT.

For reasons of mobility control as well as for protection of the tenside liquids from penetrating flooding water, a conventional polymer solution can be injected into the deposit after the last tensile liquid. For this purpose, a polymer or polymer mixture is dissolved in the flooding water in such a concentration that the viscosity is 1.2 to 10 times as high as that of the oil under reservoir conditions. In case of reservoirs of medium and relatively high salinity (1–25% total salinity), especially suitable in this connection are biopolymers or cellulose derivatives still exhibiting adequate viscosity in the presence of the increased salt concentrations and having no tendency to precipitate. See, e.g., J. Chatterji, J. K. Borchardt, J. of Petroleum Technology, November 1981, p. 2042–2056, whose disclosures are incorporated by reference herein. Suitably, injection of the polymer solution is followed by normal water flooding as the driving force. This is continued as long as oil can be extracted economically.

Without further elaboration, it is believed that one skilled in the art can, using the preceding description utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

For producing the artificial formation, a thermostated high-pressure pipe having a length of 70 cm and a diameter of 5 cm, equipped with temperature measuring means and manometer, sealable at both ends by threaded gaskets with capillary inlet and pressure maintaining valve outlet, was charged with edge-rounded quartz sand. The sand pile was then saturated with formation water A by means of a high-pressure metering pump, and the desired temperature was set by a thermostat. The permeability of the sand pile was determined with the aid of a pressure transducer. Thereafter the pile was saturated with crude oil A while simultaneously measuring the content of bound water. Subsequently, flooding water was injected at a rate of about 1.5 m/d (m/day). Formation water A was used for this water. After injecting about 1.5 PV of flooding water (1 PV about 800 ml), the produced fluid having a water dilution degree of 98–100%, the following components were injected respectively at a flooding rate of about 1 m/d (d=days) in succession:
  0.05 PV of an emulsion,
  0.1 PV of a tenside dispersion,
  0.4 PV of a polymer solution, and finally about
  1.5 PV of formation water A.
The emulsion consisted of crude oil A and formation water A (phase ratio 1:1), as well as 6.6% (based on the aqueous phase) of carboxymethylated nonylphenoloxethylate sodium salt with about 6 moles of ethylene oxide and a degree of carboxymethylation of about 75%. The tenside dispersion consisted of formation water A and the same tenside, likewise with 6.6%. The polymer of the mobility buffer was "Cellobond" HEC 100 000 A, BP Chemicals, concentration 0.25%. The formation water A contained, per liter, about 200 g of NaCl, 1 g of KCl, 12 g of $CaCl_2$, and 4 g of $MgCl_2$. Crude oil A is paraffin-base and has a density of 0.86 g/cm³. The formation temperature was 51° C., the phase inversion temperature of the oil-water-tenside system was 56° C.

The artificial formation had a porosity of about 47%, its permeability was 3 D (darcy), and the residual water content was about 25%. By water flooding, an oil extraction of 71% was attained; another 29% of oil was released by the injected tenside, so that total oil extraction was 100% of the OIP (oil in place) value. After flooding out the oil bank, the tenside broke through. Additional oil was liberated as an emulsion. During the transport of the oil bank, a pressure gradient was measured of maximally 0.5 bar/m; the maximum oil content of the bank was about 50%. Analysis of the pore volume yielded 2.2 g of tenside or 0.9 mg/g of sand, and 25 ml of oil; 20 ml of oil had been injected as an emulsion.

EXAMPLE 2 (Comparative Example)

In this example, tertiary oil recovery is carried out by normal tenside flooding. A formation as in Example 1 was wetted with formation water A and saturated with crude oil A (porosity 47%, permeability 1.2 D, bound water content 27%). The test temperature was 51° C. Flooding was first conducted with formation water A, thus obtaining an oil recovery of 79%. By the subsequent injection of 0.2 PV of tenside liquid (6.6% of the same tenside as in Example 1 in formation water A), followed by the same mobility buffer as in Example 1, another 19% of OIP was produced. The maximum oil content of the oil bank was about 40%, the maximum pressure gradient was 0.6 bar/m (flooding rate about 1 m/d). After flooding out the oil bank, the tenside broke through. Analysis of the artificial formation after flooding yielded 25 ml of oil and 7.5 g of tenside (3.2 mg/g sand). The amount of retained tenside thus is, in this example, much higher than in Example 1 according to this invention.

EXAMPLE 3 (Comparative Example)

In this example, tertiary oil recovery is accomplished by emulsion flooding.

A formation as in Example 1 was wetted with formation water A and saturated with crude oil A (porosity 47%, permeability 1.1 D, bound water content 25%). The testing temperature was 51° C. By water flooding with formation water A, an oil extraction of 76% is obtained. Another 24% of OIP was released by 0.3 PV of subsequently injected emulsion, consisting of crude oil A, formation water A (1:1), 6% (based on the aqueous phase) of the same tenside as in Example 1, followed by the same mobility buffer as in Example 1; the oil bank contains maximally 50% of oil. Thereafter the tenside broke through, thus flooding out additional oil in form of an emulsion. The maximum pressure gradient during transport of the oil bank was 0.9 bar/m.

In the analytical investigation of the pore space, 3.6 g of tenside (1.4 mg/g sand) and 64 ml of oil were detected. Although transportation of OIP was about 100%, a considerable amount of the oil, flooded in as emulsion, was retained in the pore volume. The balance of resultant oil extraction with the same or even a less favorable tenside retention is markedly less advantageous in this example as compared with Example 1 according to the invention.

EXAMPLE 4

An artificial formation as in Example 1 (porosity 47%, permeability 1.7 D, bound water content 30%, temperature 51° C., wetted with formation water A, saturated with crude oil A) was depleted of its oil to an extent of 78% by water flooding. Thereafter the following were injected in succession:

0.05 PV of an emulsion consisting of formation water A, crude oil A, phase ratio 1:1, 2% (based on the aqueous phase) of the same tenside as in the preceding examples, 0.15 PV of a 2% tenside liquid from this tenside in formation water A, 0.4 PV of HEC 100 000 A, 0.25% strength in formation water, and about 1.5 PV of formation water as driving force.

Thereby, another 22% of OIP was liberated, so that the formation yielded 100% OIP extraction. A maximum pressure gradient was measured of 0.7 bar/m; the flooding rate was about 1 m/d.

Analytical examination of the pore volume showed a tenside retention of 1.6 g (or 0.6 mg/g sand) and an oil quantity of 25 ml. About 20 ml of oil had been injected in the form of the emulsion.

EXAMPLE 5

In an artificial formation as in Example 1 (porosity 46%, permeability 2.6 D, bound water content 30%, wetted with formation water A, saturated with crude oil A, temperature 49° C.), 79% of OIP was released by water flooding. Thereafter the following components were injected in succession:

0.05 PV of an emulsion, consisting of formation water A, crude oil A, phase ratio 1:1, and 5% (based on the aqueous phase) of a carboxymethylated "Alfol" 1214 oxethylate with about 4.5 moles of ethylene oxide/mole and a degree of carboxymethylation of about 75%, 0.1 PV of the same tenside in the same concentration in formation water A, 0.4 PV of HEC 100 000 A, 0.25% strength in formation water, and about 1.5 PV of formation water as driving force.

The phase inversion temperature of the system formation water/crude oil/tenside was 53° C.

Another 20% of OIP could be released by the effect of the tenside, so that total oil extraction was 99% OIP. The maximum pressure gradient at a flooding rate of 1.1 m/d was 0.6 bar/m.

Subsequent analysis of the pore volume yielded 2.4 g of tenside (or 1 mg/g sand) and 31 ml of oil.

EXAMPLE 6

By water flooding, 78% OIP could be liberated in an artificial formation similar to Example 1 (porosity 48%, permeability 1.6 D, bound water content about 30%, wetted with formation water A, saturated with crude oil A), but having a length of 140 cm and adjusted to a temperature of 56° C. Subsequently, the following components were injected in succession:

0.05 PV of an emulsion consisting of crude oil A, formation water A, and 5% (based on the aqueous phase) of carboxymethylated nonylphenoloxethylate with about 6 moles of ethylene oxide/mole and a degree of carboxymethylation of about 100%, 0.1 PV of a tenside dispersion consisting of 5% of the same tenside in formation water A, 0.4 PV of a mobility buffer as in the preceding examples, and about 1 PV of formation water A as the driving force.

The phase inversion temperature of the system crude oil/formation water/tenside was 63° C. Another 22% OIP was released by the tenside so that total oil extraction was 100% OIP. Following the oil bank with a maximum oil content of about 50%, the tenside broke through, thus liberating additional oil as an emulsion. A maximum pressure gradient of 0.5 bar/m was measured.

During the subsequent analysis of the artificial formation, 4.3 g of tenside and, respectively, 0.9 mg/g of sand and 51 ml of oil were found. With a pore volume which—as compared with the other examples—was twice as large, 41 ml of oil had been injected as an emulsion.

EXAMPLE 7

An artificial formation as in Example 1 (porosity 47%, permeability 1.8 D, water content 18%, temperature 51° C., wetted with formation water A and saturated with crude oil A) was water-flooded, thus obtaining an oil extraction of 76% OIP. Subsequently the following liquids were injected:

0.05 PV of an emulsion consisting of crude oil A, formation water A (phase ratio 1:1), and 2.5% (based on the aqueous phase) of the same tenside as in Example 1, but having an addition of 20% (based on the tenside amount ) of isobutanol, 0.15 PV of a tenside liquid of the same tenside and cotenside in the same concentration, 0.4 PV of polymer solution as in Example 1, and then about 1 PV of formation water A as the driving fluid The phase inversion temperature of the system crude oil/formation water/tenside/cotenside was 55° C.

Another 19% OIP was recovered by the action of the tenside, whereby total oil extraction rose to 95% OIP. With a flooding rate of 1.3 m/d, the maximum pressure gradient was 1 bar/m. The pore volume analysis showed a tenside content of 2.5 g of 1.1 mg/g of sand, and an oil content of 46 ml of oil.

EXAMPLE 8

A formation as in Example 1 (porosity 47%, permeability 1.8 D, bound water content 20%, temperature 51° C., wetted with formation water A and saturated with crude oil A) was water-flooded, thus obtaining an oil extraction of 75%. Subsequently the following components were injected in succession:

0.05 PV of an emulsion consisting of crude oil A, formation water (phase ratio 1:2), and 3.5% (based on the aqueous phase) of the same tenside as in Example 1, 0.1 PV of an aqueous tenside liquid of the same tenside in the same concentration, 0.4 PV of polymer solution as in Example 1, and about 1.5 PV of formation water A.

By the effect of the tenside, another 21% OIP was released so that the total oil extraction rose to 96% OIP. Subsequently, the tenside broke through. With a flooding rate of about 1 m/d, a maximum pressure gradient was measured of about 0.8 bar/m. Subsequent analysis of the artificial formation yielded a tenside content of 1.9 g (or 0.8 mg/g sand) and an oil content of 31 ml; 12 ml of oil had been injected as an emulsion.

EXAMPLE 9

This example demonstrates that even an emulsion slug flooded in after the tenside slug is of advantage as compared with pure emulsion flooding or tenside flooding.

With an artificial formation as in Example 1 (porosity 46%, permeability 1.4 D, bound water content 25%, temperature 51° C., wetted with formation water A and saturated with crude oil A), an oil extraction of 75% was attained by water flooding. Then the following components were injected in succession;

0.1 PV of a tenside dispersion of 5% of the tenside used in Example 1 in formation water A, 0.1 PV of an emulsion consisting of crude oil A, formation water A (phase ratio 1:1), and 5% (based on the aqueous phase) of the same tenside, 0.4 PV of the polymer solution of Example 1, and about 1.5 PV of formation water.

Another 24% OIP was released by the action of the tenside, so that total oil extraction rose to 99% OIP. After flooding out the oil bank, the tenside breaks through. The pressure gradient, with a flooding rate of 0.8 m/d, assumes values of maximally 0.5 bar/m.

Investigation of the pore volume showed a tenside retention of 2.4 g (or 1 mg/g sand) and an oil content of 34 ml; 20 ml of oil had been injected as an emulsion.

EXAMPLE 10

This example is to demonstrate that the crude oil required for producing the emulsion—if not available in adequate amounts—can also be replaced by a hydrocarbon mixture produced in a controlled fashion.

In correspondence with the weight ratio of paraffinic and naphthenic proportions in crude oil A, a mixture was prepared from n-dodecane and cyclooctane. Such an amount of toluene was added to this mixture that an emulsion, produced with formation water A and the tenside recited in Example 1, indicates the same phase inversion temperature (56° C.) as crude oil A. The model oil produced in this way is composed of 79% n-dodecane, 13% cyclooctane, and 8% toluene.

An artificial formation as in Example 1 (porosity 47%, permeability 1.1 D, bound water content 26%, temperature 51° C., wetted with formation water A and saturated with crude oil A) was exhaustively flooded with formation water, thus attaining a degree of oil extraction of 76% OIP. Subsequently, the following components were injected in succession:

0.05 PV of an emulsion consisting of formation water A, model oil (phase ratio 1:1), and 5% (based on the aqueous phase) of the tenside used in Example 1, 0.1 PV of tenside dispersion of the same tenside in identical concentration in formation water A, 0.4 PV of polymer solution as in Example 1, and about 1.5 PV of formation water.

Another 23% OIP was liberated by the effect of the tenside, so that total oil extraction was 99% OIP. After flooding out the bank, the tenside broke through. The oil content of the bank was maximally about 50%. With a flooding rate of about 1 m/d, a pressure gradient was measured of 1.4 bar/m.

Analytically, a tenside retention of 3.5 g (or 1.4 mg/g sand) and an oil content of 20 ml were detected in the pore volume. The same amount of model oil had been injected as an emulsion.

EXAMPLE 11

This example, and the following example, demonstrate use of the process of this invention in connection with different reservoir systems.

Formation water B has the following composition (g/l): Na 38; K 0.4; Ca 8; Mg 1.5; Sr 0.4; and Cl 80. Crude oil B consists of 58% paraffin, 26% naphthenes, and 16% aromatics. The density is 0.85 g/cm$^3$.

An artificial formation similar to that of Example 1 (porosity 47%, permeability 1.5 D, bound water content 27%), but with a temperature of 38° C., wetted with formation water B and saturated with reservoir oil B, was flooded exhaustively with formation water, thus attaining a degree of oil extraction of 77%. The degree of water dilution was about 99%. The following liquids were then injected:

0.05 PV of an emulsion consisting of crude oil B, formation water B (phase ratio 1:1), and 2% (based on the aqueous phase) of carboxymethylated nonylphenoloxethylate with 4.9 moles of ethylene oxide/mole having a degree of carboxymethylation of 100%, 0.15 PV of the same tenside in the same concentration in formation water B, 0.4 PV of the same polymer as in Example 1 in formation water B, and about 1.5 PV of formation water.

The phase inversion temperature of the system crude oil/formation water/tenside here was 45° C.

By the action of the tenside, another 23% OIP was liberated so that total oil extraction is 100% OIP. The maximum oil content of the oil bank was about 55%; a maximum pressure gradient (flooding rate about 1 m/d) of 1.1 bar/m was measured.

During the subsequent analysis of the pore volume, 1.5 g of tenside (or 0.6 mg/g sand) and 38 ml of oil were detected.

EXAMPLE 12

Formation water C has approximately the following composition: 24.4 g/l NaCl, 0.13 g/l KCl, 0.45 g/l CaCl$_2$, 0.35 g/l MgCl$_2$, and 0.03 g/l SrCl$_2$. Crude oil C consists of 40% naphthenic hydrocarbons, 35% paraffinic hydrocarbons, and 25% aromatic hydrocarbons. The density is about 0.9 g/cm$^3$.

An artificial formation similar to that of Example 1 (porosity 46%, permeability 1.5 D, bound water content 23%) but with a temperature of 63° C., wetted with formation water C and saturated with crude oil C, was exhaustively water-flooded, thus obtaining an oil extraction of 78% OIP. Subsequently, the following components were injected in succession:

0.05 PV of an emulsion consisting of crude oil C, formation water C (phase ratio 1:1), and 6% (based on the aqueous phase) of carboxymethylated nonylphenoloxethylate with 3 moles of propylene oxide/mole and 5.7 moles of ethylene oxide/mole, corresponding to the formula $C_9H_{19}$—$C_6H_4O[C_2H_3(CH_3)O]_3(C_2H_4O)_{5.7}CH_2COONa$, the degree of carboxymethylation being about 70%, 0.1 PV of the same tenside in the same concentration in formation water C, 0.4 PV of the same polymer as in Example 1 in formation water C, and about 1.5 PV of formation water.

The phase inversion temperature of the system crude oil/formation water/tenside was 68° C.

Another 18% OIP was released by the action of the tenside, the maximum oil content of the oil bank being about 45%. A maximum pressure gradient of about 0.6 bar/m was measured at a flooding rate of about 0.9 m/d.

Pore volume analysis showed 3.1 g of tenside (or 0.9 mg/g sand) and 50 ml of oil.

EXAMPLE 13

In this example, a cylindrical core of Bentheim sandstone having a diameter of about 8 cm and a length of about 50 cm was used as the model formation. The core was embedded in epoxy resin, its end faces were sealed by means of metal flanges made tight with O-rings. The testing temperature was 56° C. After wetting the formation with formation water A, determination of the pore volume (575 ml) and permeability (1,100 mD), the formation was saturated with crude oil A (bound water 20%). By exhaustive flooding with formation water A, 51% OIP was released. Subsequently, the following components were injected in succession:

0.05 PV of an emulsion consisting of formation water A, crude oil A, phase ratio 1:1, and 3% of a carboxymethylated dinonylphenoloxethylate with about 12 moles EO/mole and a degree of carboxymethylation of about 85%, 0.15 PV of tenside dispersion of the same tenside in the same concentration in formation water A, 0.4 PV of polymer solution as in Example 1, and about 1 PV of formation water.

By the action of the tenside (PIT 59° C.), another 34% OIP was liberated so that total oil extraction was 84% OIP. After flooding out the oil bank, the tenside broke through. The oil content of the bank was maximally 65%. With a flooding rate of about 0.5 m/d, a maximum pressure gradient was measured of 1.2 bar/m.

Analytically, a tenside retention of 2.1 g or 0.4 mg/g of sand was detected in the pore volume.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for reservoir oil extraction from an oil-bearing rock formation of medium or high salinity comprising successively injecting therein at least two tenside-containing liquids, and then recovering said reservoir oil, wherein the tenside in each case is a carboxymethylated oxethylate, and at least one of said liquids is an emulsion comprising an oil phase, an aqueous phase, and a carboxymethylated oxethylate tenside as the emulsifier which is selected so that the phase inversion temperature of the system of (reservoir oil/flooding water/emulsifier/any injection liquid additives) lies 0°–10° C. above the reservoir temperature, and at least one of said liquids is a solution or dispersion of a carboxymethylated oxethylate tenside in flooding water, wherein this tenside is also selected so that the phase inversion temperature of the system (reservoir oil/flooding water/tenside/any additives) lies 0°–10° C. above the reservoir temperature, and wherein all of said tensides are effective amounts of a mixture of 0–90 wt.% of oxethylates of the formula $$R-(OC_2H_3(CH_3))_m(OC_2H_4)_nH$$

and 100–10 wt.% of carboxymethylated oxethylates of the formula $$R-(OC_2H_3(CH_3))_m(OC_2H_4)_nOCH_2COOM$$

wherein
  R is a hydrocarbon aliphatic group of 6–20 carbon atoms, an alkylphenyl residue of 3–18 carbon atoms in the alkyl group, a dialkylphenyl residue of 1–18 carbon atoms per alkyl group, the total number of carbon atoms in both alkyl chains being 5–30, or a trialkylphenyl residue of 1–18 carbon atoms per alkyl chain wherein the total number of carbon atoms in the three alkyl chains is 6–40;
  m is 0–20;
  n is 1–20;
  M is an alkali or alkaline earth metal ion or ammonium.

2. A method of claim 1 wherein the emulsion liquid is flooded into the reservoir before said solution or dispersion.

3. A method of claim 1 wherein the emulsion liquid is flooded into the reservoir after said solution or dispersion.

4. A method of claim 2 wherein two tenside containing liquids are injected.

5. A method of claim 2 wherein three tenside-containing liquids are injected and two of these are emulsions.

6. A method of claim 1 wherein the amount of oxethylate is 0–10 wt%.

7. A method of claim 1, wherein the successively injected, tenside-containing liquids contain the same tenside.

8. A method of claim 1, wherein the successively injected, tenside-containing liquids contain different tensides but have approximately the same phase inversion temperature of the system of reservoir oil/flooding water/tenside.

9. A method of claim 1 wherein the tenside or emulsifier concentration is 0.1–30 wt%, based on the weight of the aqueous phase.

10. A method of claim 1 wherein the crude oil of the reservoir is used as the oil phase.

11. A method of claim 1 wherein the volume ratio of oil phase to aqueous phase in the emulsions liquids is 3:1 to 1:10.

12. A method of claim 1 wherein the size of the slug of tenside-containing liquids is 0.01–2 pore volumes.

13. A method of claim 1 wherein an emulsion slug is flooded in before the tenside slug and the volume ratios of the emulsion slug to the tenside slug is 1:20 to 1:2.

14. A method of claim 1 wherein tenside-containing liquids do comprise an amount of at least one injection liquid additive.

15. A method of claim 14 wherein the additive is a cosurfactant which is a mono- or polyhydric alcohol.

16. A method of claim 14 wherein the additive is a water-soluble, viscosity-raising polymer.

17. A method of claim 1 further comprising injecting, prior to injection of the first tenside-containing liquid, 0.05–4 pore volumes of flooding water into the reservoir.

18. A method of claim 1 further comprising, after injection of the last tenside-containing liquid, injecting flooding water into the reservoir.

19. A method of claim 18 wherein the flooding water contains a water-soluble, viscosity-raising polymer.

20. A method of claim 1 wherein in the tensides, m=0.

* * * * *